(12) United States Patent
Shimizu et al.

(10) Patent No.: US 9,086,140 B2
(45) Date of Patent: Jul. 21, 2015

(54) POWER TRANSMISSION DEVICE

(75) Inventors: Tetsuya Shimizu, Anjo (JP); Tomomi Ishikawa, Anjo (JP); Tomoya Jinno, Anjo (JP); Kenichi Tsuchida, Nishio (JP); Kazunori Ishikawa, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 795 days.

(21) Appl. No.: 13/281,998

(22) Filed: Oct. 26, 2011

(65) Prior Publication Data

US 2012/0137670 A1    Jun. 7, 2012

(30) Foreign Application Priority Data

Dec. 3, 2010    (JP) ................................. 2010-270285

(51) Int. Cl.
*F16H 61/00*    (2006.01)
*F16H 61/02*    (2006.01)

(52) U.S. Cl.
CPC ........ *F16H 61/0021* (2013.01); *F16H 61/0031* (2013.01); *F16H 61/0206* (2013.01); *F16H 2312/14* (2013.01); *F16H 2312/20* (2013.01)

(58) Field of Classification Search
CPC .............. F16H 61/0031; F16H 61/065; F16H 61/0206; F16H 61/0021; F16H 2312/20; F16H 2312/14
USPC .................................................. 60/430, 459
See application file for complete search history.

(56) References Cited

U.S. PATENT DOCUMENTS

| 5,644,916 | A | * | 7/1997 | Hayasaki | 60/436 |
| 8,312,895 | B2 | * | 11/2012 | Shimizu et al. | 137/625.64 |
| 8,454,477 | B2 | * | 6/2013 | Shimizu et al. | 477/150 |
| 2007/0240776 | A1 | * | 10/2007 | Mizui | 137/625.69 |
| 2010/0193313 | A1 | | 8/2010 | Shimizu et al. | |
| 2010/0203989 | A1 | | 8/2010 | Shirasaka et al. | |

FOREIGN PATENT DOCUMENTS

| JP | A 2005-273633 | 10/2005 |
| JP | A 2010-121771 | 6/2010 |
| JP | A-2010-175039 | 8/2010 |

(Continued)

OTHER PUBLICATIONS

International Search Report issued in International Patent Application No. PCT/JP2011/077223; mailed Dec. 27, 2011; with English-language translation.

*Primary Examiner* — Nathaniel Wiehe
*Assistant Examiner* — Abiy Teka
(74) *Attorney, Agent, or Firm* — Oliff PLC

(57) ABSTRACT

A power transmission device that transmits power from a motor to a wheel via a hydraulically driven friction engagement element and that includes a mechanical pump driven by the motor to produce a hydraulic pressure that is regulated by a pressure regulating valve; an electric pump that produces a hydraulic pressure; a switching mechanism that either switches an output pressure of the regulating valve or an output pressure of the electric pump to a servo of the engagement element based upon a signal pressure; a passage to supply pressure from the mechanical pump to the hydraulic servo; a check valve in the passage that allows supply of the pressure from the mechanical pump to the hydraulic servo and prohibits supply of the pressure from the electric pump to the mechanical pump, and the switching mechanism either shuts off or allows communication through the passage based upon the signal pressure.

7 Claims, 8 Drawing Sheets

(56) References Cited

FOREIGN PATENT DOCUMENTS

| | | |
|---|---|---|
| JP | A 2010-180960 | 8/2010 |
| JP | A 2010-181010 | 8/2010 |
| JP | A 2010-203606 | 9/2010 |
| WO | WO 2010058660 A1 * | 5/2010 |

* cited by examiner

| | C-1 | C-2 | C-3 | B-1 | B-2 | F-1 | SL1 | SL2 | SL3 | SL5 | S1 | S2 |
|---|---|---|---|---|---|---|---|---|---|---|---|---|
| P | | | | | | | | | | | | |
| REV | | | ○ | | ○ | | | | | | | |
| N | | | | | | | | | | | | |
| D 1st | ○ | | | | (○) | ○ | ○ | | (○) | | (○) | |
| D 2nd | ○ | | ○ | | | | ○ | | | ○ | | |
| D 3rd | ○ | | ○ | | | | ○ | | ○ | | | |
| D 4th | ○ | ○ | | | | | ○ | ○ | | | | |
| D 5th | | ○ | ○ | | | | | ○ | ○ | | | |
| D 6th | | ○ | | ○ | | | | ○ | | ○ | | |

(○):ENGAGED WHEN ENGINE BRAKE IS IN OPERATION

POWER TRANSMISSION DEVICE

INCORPORATION BY REFERENCE

The disclosure of Japanese Patent Application No. 2010-270285 filed on Dec. 3, 2010 including the specification, drawings and abstract is incorporated herein by reference in its entirety.

BACKGROUND OF THE INVENTION

The present invention relates to a power transmission device that is mounted on a vehicle equipped with a motor and transmits power from the motor to a driving wheel side via hydraulically driven friction engagement elements.

DESCRIPTION OF THE RELATED ART

Conventionally, as a power transmission device of such a type as described above, there is proposed a device that is mounted on a vehicle with an idle-stop function, and provided with a mechanical pump operated by power of an engine, a linear solenoid valve SLC1 that regulates a discharge pressure from the mechanical pump, an electromagnetic pump, and a switching valve that is operated by hydraulic pressure (modulator pressure) from the mechanical pump to selectively switch between a connection between an output port of the linear solenoid valve SLC1 and a vehicle start clutch C1 (hydraulic servo) and a connection between a discharge port of the electromagnetic pump and the clutch C1 (for example, refer to Japanese Patent Application Publication No. JP-A-2010-175039). In this device, during an idle stop of the engine, a hydraulic pressure (stroke-end pressure) is applied to the clutch C1 by driving the electromagnetic pump instead of the mechanical pump that is stopped from operating as the engine stops running. Accordingly, the clutch C1 can be engaged immediately when the hydraulic pressure from the mechanical pump rises at the next engine startup, thereby enabling the vehicle to start smoothly.

SUMMARY OF THE INVENTION

In the power transmission device described above, the switching valve is structured such that a spool is moved to one end side by an urging force of a spring so as to connect the discharge port of the electromagnetic pump to the clutch C1 at normal time, whereas the spool is moved to the other end side so as to connect the output port of the linear solenoid valve SLC1 to the clutch C1 when a hydraulic pressure overcoming the urging force of the spring is introduced. At the engine startup, the clutch C1 is engaged only after the rotational speed of the engine reaches a rotational speed at which the mechanical pump produces the hydraulic pressure (hydraulic pressure at a preset pressure or more) overcoming the urging force of the spring, and the switching valve is switched to connect between the output port of the linear solenoid valve SLC1 and the clutch C1. Therefore, a slight time lag occurs before the clutch C1 is engaged. Accordingly, if an accelerator pedal is deeply depressed and engine torque rapidly increases during this time lag, the clutch C1 may not be engaged in time, thereby causing engine racing or clutch slip. In this regard, if the preset pressure is reduced by using a spring of a small spring load as the spring of the switching valve, the switching valve can be quickly switch to connect between the output port of the linear solenoid valve SLC1 and the clutch C1 at the engine startup. However, the connection between the output port of the linear solenoid valve SLC1 and the clutch C1 is maintained until the discharge pressure of the mechanical pump is reduced to below the preset pressure when the engine comes to a stop. Therefore, the hydraulic pressure applied to the clutch C1 drops significantly below the stroke-end pressure, and thus the piston position of the clutch C1 moves away from the stroke end. Because the electromagnetic pump has a much smaller discharge capacity than that of the mechanical pump, the clutch C1 requires a certain amount of time to stroke again. Therefore, if the engine is started with the accelerator pedal deeply depressed during this time, the clutch C1 is not engaged in time.

It is a main object of a power transmission device of the present invention to make it possible to quickly engage friction engagement elements as a motor starts up, and to quickly release the engagement of the friction engagement elements as the motor stops.

In order to achieve the main object described above, the power transmission device of the present invention employs the following means.

According to an aspect of the present invention, a power transmission device that is mounted on a vehicle equipped with a motor and transmits power from the motor to a driving wheel side via a hydraulically driven friction engagement element includes: a mechanical pump that is driven by the power from the motor to produce a hydraulic pressure; a pressure regulating valve that regulates the hydraulic pressure from the mechanical pump; an electric pump that is driven by supplied electric power to produce a hydraulic pressure; a switching mechanism that is formed of one or more switching valves operated by a signal pressure produced based on the hydraulic pressure from the mechanical pump and that establishes a first state in which an output pressure of the pressure regulating valve can be supplied to a hydraulic servo of the friction engagement element when the signal pressure is a preset pressure or more, and establishes a second state in which the hydraulic pressure from the electric pump can be supplied to the hydraulic servo when the signal pressure is below the preset pressure; a bypass oil passage through which the hydraulic pressure from the mechanical pump can be supplied to the hydraulic servo; and a check valve that is arranged in the bypass oil passage, and allows supply of the hydraulic pressure from the mechanical pump to the hydraulic servo and prohibits supply of the hydraulic pressure from the electric pump to the mechanical pump, wherein the switching mechanism is further structured so as to shut off communication through the bypass oil passage in the first state and allow communication through the bypass oil passage in the second state.

The power transmission device of the aspect of the present invention is provided with the switching mechanism that is formed of the one or more switching valves operated by a signal pressure produced based on the hydraulic pressure from the mechanical pump and that establishes, when the signal pressure is a preset pressure or more, the first state in which the output pressure of the pressure regulating valve can be supplied to the hydraulic servo of the friction engagement element, and establishes, when the signal pressure is below the preset pressure, the second state in which the hydraulic pressure from the electric pump can be supplied to the hydraulic servo. The power transmission device of the present invention is also provided with the bypass oil passage through which the hydraulic pressure from the mechanical pump can be supplied to the hydraulic servo, and the check valve, which allows supply of the hydraulic pressure from the mechanical pump to the hydraulic servo and prohibits supply of the hydraulic pressure from the electric pump to the mechanical pump, is arranged in the bypass oil passage. The switching mechanism is further structured so as to shut off communication through the bypass oil passage in the first state, and allow communication through the bypass oil passage in the second state. With this arrangement, when the motor starts up, the hydraulic pressure from the mechanical pump can be supplied to the hydraulic servo of the friction engagement element via the bypass oil passage without waiting until the switching mechanism is switched from the second state to the first state, and, when the switching mechanism is switched to the first state, the hydraulic pressure from the mechanical pump can be supplied to the hydraulic servo via the pressure regulating valve. As a result, it is possible to quickly engage the friction engagement element as the motor starts up and quickly release the engagement of the friction engagement element as the motor stops, by adjusting the preset pressure of the switching valve to an appropriate value. Here, the term "electric pump" includes an ordinary electric pump operated by power of an electric motor and an electromagnetic pump.

In the power transmission device of the present invention described above, the switching mechanism may include a first signal pressure port that is connected to a mechanical pump oil passage through which oil discharged from the mechanical pump flows, a first communication port that is connected to an upstream side of the bypass oil passage, and a second communication port that is connected to a downstream side of the bypass oil passage, a spool that allows and shuts off communication between the first communication port and the second communication port, and an urging member that urges the spool. In the power transmission device, the switching mechanism may be structured so as to shut off communication between the first communication port and the second communication port by moving the spool to one end side by a hydraulic pressure of the preset pressure or more when the hydraulic pressure acts through the first signal pressure port, and allow communication between the first communication port and the second communication port by moving the spool to the other end side by an urging force of the urging member when the hydraulic pressure of the preset pressure or more does not act through the first signal pressure port. In addition, an electric pump oil passage through which oil discharged from the electric pump flows may be connected to the downstream side of the bypass oil passage. In the power transmission device according to this aspect of the present invention, the check valve may be installed on the downstream side of the bypass oil passage. Moreover, in the power transmission device according to these aspects of the present invention, the switching mechanism may further include a first input port that is connected to a pressure regulating valve oil passage through which oil output from the pressure regulating valve flows, a second input port that is connected to the electric pump oil passage, and an output port that is connected to a hydraulic servo oil passage communicating with the hydraulic servo. In the power transmission device, the switching mechanism may be formed of one switching valve that allows communication between the first input port and the output port and shuts off communication between the second input port and the output port by moving the spool to the one end side by the hydraulic pressure of the preset pressure or more when the hydraulic pressure acts through the first signal pressure port, and that shuts off communication between the first input port and the output port and allows communication between the second input port and the output port by moving the spool to the other end side by the urging force of the urging member when the hydraulic pressure of the preset pressure or more does not act through the first signal pressure port. With this arrangement, because the functions of the switching mechanism can be achieved by one switching valve, the size of the device can be further reduced. In this case, the power transmission device may further include a supply valve that is installed in the mechanical pump oil passage and is capable of allowing and shutting off the hydraulic pressure supplied from the mechanical pump. In the power transmission device, the switching mechanism may further include a second signal pressure port connected to the mechanical pump oil passage via the supply valve, and may be structured to establish the second state by moving the spool to the other end side by a hydraulic pressure and the urging force of the urging member when the hydraulic pressure acts through the second signal pressure port. With this arrangement, even when the hydraulic pressure cannot be supplied from the pressure regulating valve to the hydraulic servo of the friction engagement element due to occurrence of a failure in the pressure regulating valve while the switching mechanism is in the first state, the hydraulic pressure from the mechanical pump can be supplied to the hydraulic servo of the friction engagement element via the bypass oil passage by placing the switching mechanism in the second state using the supply valve.

In addition, the power transmission device of the present invention can include a control unit that controls the pressure regulating valve so as to supply the hydraulic pressure from the mechanical pump to the hydraulic servo when the mechanical pump is in operation, and controls the electric pump so as to supply the hydraulic pressure from the electric pump to the hydraulic servo when the mechanical pump is not in operation.

DETAILED DESCRIPTION OF THE EMBODIMENT

An embodiment of the present invention will be described next.

Figure 1:
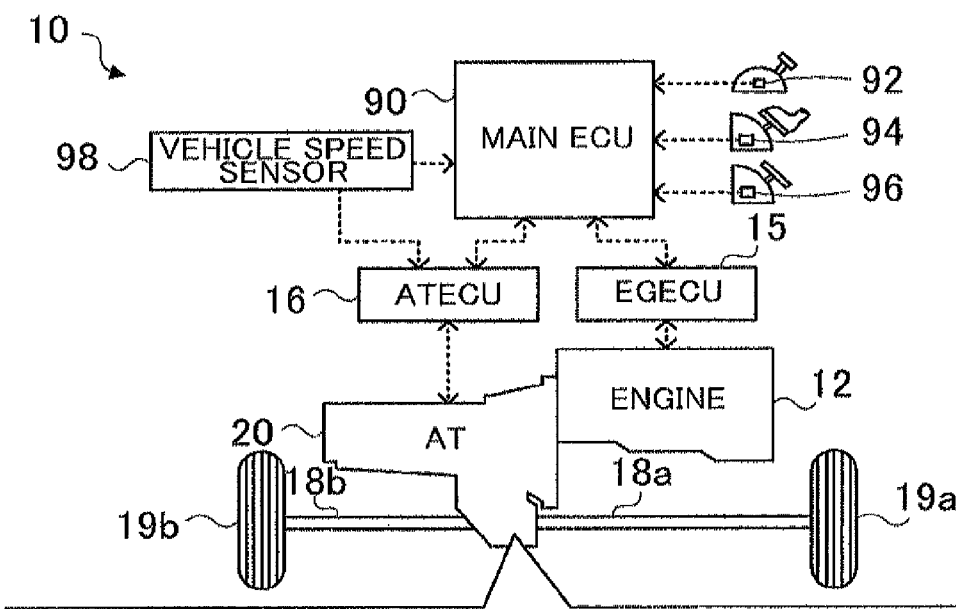
FIG. 1 is a block diagram showing a schematic structure of a vehicle 10 equipped with a power transmission device 20 according to as an embodiment of the present invention.
Figure 1:
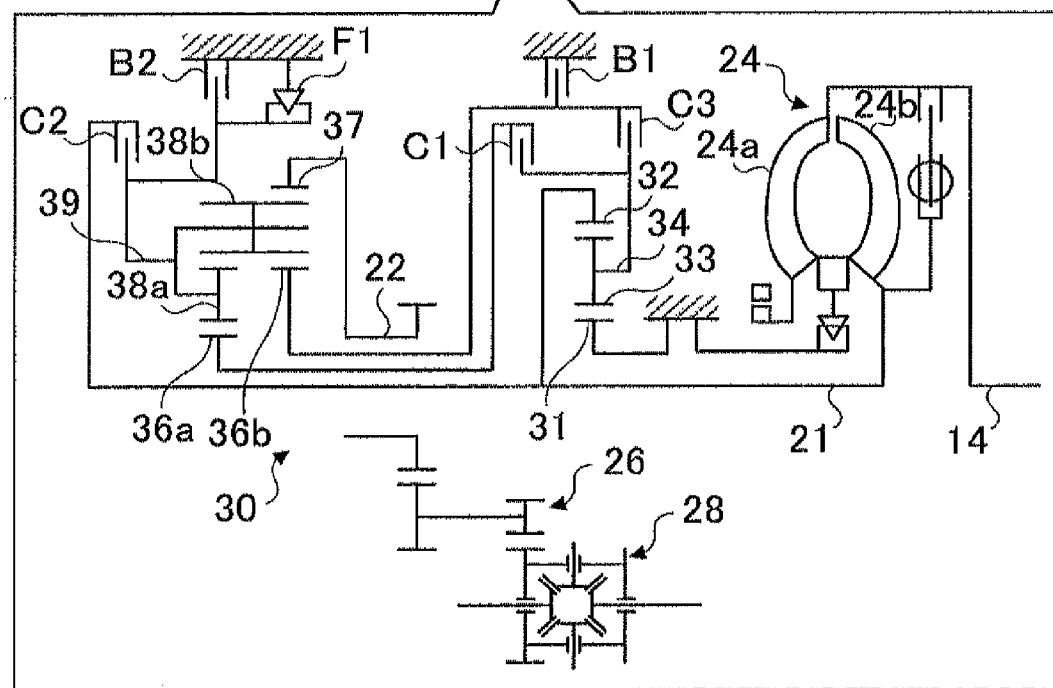
Figures 2, 3:
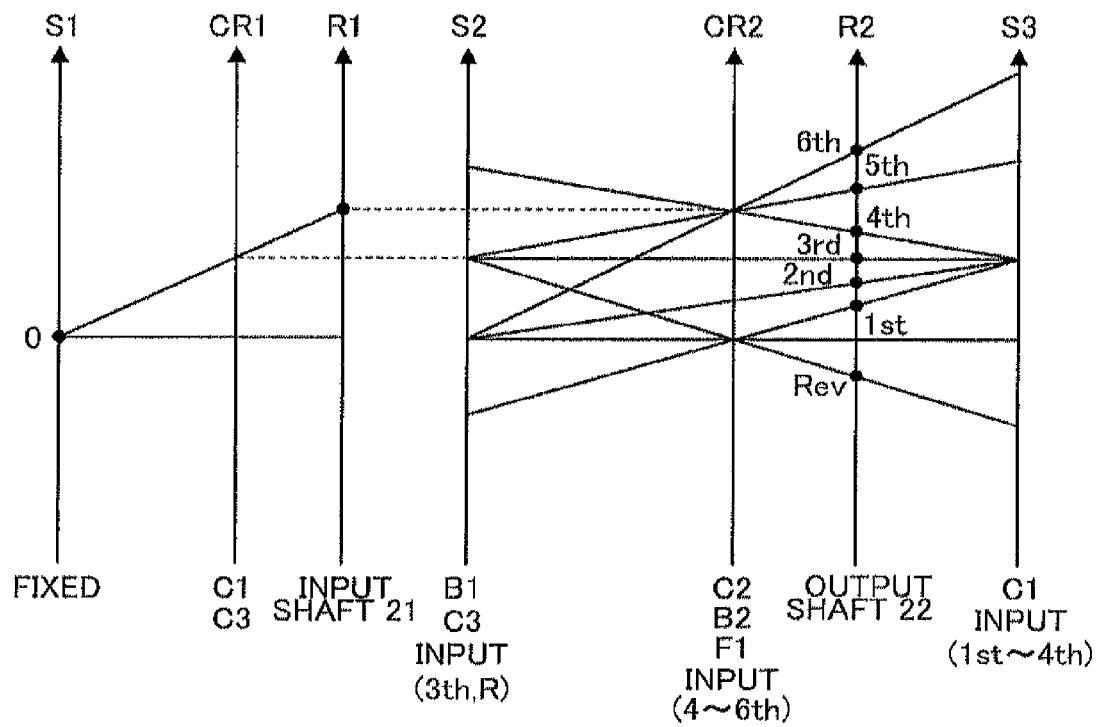
FIG. 2 is an explanatory diagram showing an operation table of a speed change mechanism 30.
FIG. 3 is a collinear diagram showing relationships among rotational speeds of rotational elements of the speed change mechanism 30.

FIG. 1 is a block diagram showing a schematic structure of a vehicle 10 equipped with a power transmission device 20 according to an embodiment of the present invention. FIG. 2 is an explanatory diagram showing an operation table of a speed change mechanism 30.

As shown in FIG. 1, the vehicle 10 is provided with an engine 12 serving as an internal combustion engine that outputs a power by explosive combustion of hydrocarbon-based fuel such as gasoline or diesel oil, an engine electronic control unit (engine ECU) 15 that controls operation of the engine 12, a power transmission device 20 that is connected to a crankshaft 14 of the engine 12 and also connected to left and right axles 18a and 18b of wheels 19a and 19b so as to transmit the power from the engine 12 to the axles 18a and 18b, an automatic transmission electronic control unit (AT ECU) 16 that controls the power transmission device 20, and a main electronic control unit (main ECU) 90 that controls the entire vehicle. Note that the main ECU 90 is supplied via input ports with signals such as a shift position SP from a shift position sensor 92, an accelerator operation amount Acc from an accelerator pedal position sensor 94, a brake switch signal BSW from a brake switch 96, and a vehicle speed V from a vehicle speed sensor 98. Note also that the main ECU 90 is connected to the engine ECU 15 and the AT ECU 16 via communication ports, and communicates with the engine ECU 15 and the AT ECU 16 to send and receive various control signals and data.

As shown in FIG. 1, the power transmission device 20 includes: a torque converter 24 having a lock-up clutch and formed of a pump impeller 24a on the input side connected to the crankshaft 14 of the engine 12 and a turbine runner 24b on the output side; the stepped speed change mechanism 30 that has an input shaft 21 connected to the turbine runner 24b of the torque converter 24 and an output shaft 22 connected to the axles 18a and 18b via a gear mechanism 26 and a differential gear 28, and changes speed of the power supplied to the input shaft 21 and outputs the power to the output shaft 22 at the changed speed; and a hydraulic circuit 40 (refer to FIG. 4) serving as an actuator driving the speed change mechanism 30. Note that, in the embodiment, the torque converter 24 is interposed between the crankshaft 14 of the engine 12 and the speed change mechanism 30. However, the present invention is not limited to this embodiment, and various starting devices may be employed.

The speed change mechanism 30 is structured as a six-speed stepped speed change mechanism, and is provided with a single-pinion type planetary gear mechanism, a Ravigneaux type planetary gear mechanism, three clutches C1, C2, and C3, two brakes B1 and B2, and a one-way clutch F1. The single-pinion type planetary gear mechanism is provided with a sun gear 31 that is an external gear, a ring gear 32 that is an internal gear arranged concentrically with the sun gear 31, a plurality of pinion gears 33 meshing with the sun gear 31 and also with the ring gear 32, and a carrier 34 supporting the plurality of pinion gears 33 in a rotatable and revolvable manner. The sun gear 31 is fixed to a case, and the ring gear 32 is connected to the input shaft 21. The Ravigneaux type planetary gear mechanism is provided with two sun gears 36a and 36b that are external gears, a ring gear 37 that is an internal gear, a plurality of short pinion gears 38a meshing with the sun gear 36a, a plurality of long pinion gears 38b meshing with the sun gear 36b and the plurality of short pinion gears 38a and also meshing with the ring gear 37, and a carrier 39 connecting the plurality of short pinion gears 38a and the plurality of long pinion gears 38b and supporting the short pinion gears 38a and the long pinion gears 38b in a rotatable and revolvable manner. The sun gear 36a is connected to the carrier 34 of the single-pinion type planetary gear mechanism via the clutch C1. The sun gear 36b is connected to the carrier 34 via the clutch C3 and also to the case via the brake B1. The ring gear 37 is connected to the output shaft 22. The carrier 39 is connected to the input shaft 21 via the clutch C2. The carrier 39 is also connected to the case via the one-way clutch F1 and also via the brake B2 that is provided in parallel with the one-way clutch F1.

As shown in FIG. 2, the speed change mechanism 30 can perform switching among first to sixth forward speeds, a reverse speed and a neutral position by combinations of turning on/off (engagement and disengagement) of the clutches C1 to C3 and turning on/off of the brakes B1 and B2. The reverse speed state can be established by turning on the clutch C3 and the brake B2, and turning off the clutches C1 and C2 and the brake B1. The first forward speed state can be established by turning on the clutch C1, and turning off the clutches C2 and C3 and the brakes 131 and B2. In the first forward speed state, the brake B2 is turned on when an engine brake is in operation. The second forward speed state can be established by turning on the clutch C1 and the brake B1, and turning off the clutches C2 and C3 and the brake B2. The third forward speed state can be established by turning on the clutches C1 and C3, and turning off the clutch C2 and the brakes B1 and B2. The fourth forward speed state can be established by turning on the clutches C1 and C2, and turning off the clutch C3 and the brakes B1 and B2. The fifth forward speed state can be established by turning on the clutches C2 and C3, and turning off the clutch C1 and the brakes B1 and B2. The sixth forward speed state can be established by turning on the clutch C2 and the brake B1, and turning off the clutches C1 and C3 and the brake B2. The neutral state can be established by turning off all of the clutches C1 to C3 and the brakes B1 and B2. Note that FIG. 3 shows an explanatory diagram explaining relationships among rotational speeds of rotational elements at respective shift speeds of the speed change mechanism 30. In the diagram, the axis S1 represents a rotational speed of the sun gear 33; the axis CR1 represents a rotational speed of the carrier 34; the axis R1 represents a rotational speed of the ring gear 32; the axis S2 represents a rotational speed of the sun gear 36b; the axis S3 represents a rotational speed of the sun gear 36a; the axis CR2 represents a rotational speed of the carrier 39; and the axis R2 represents a rotational speed of the ring gear 37.

Figure 4:
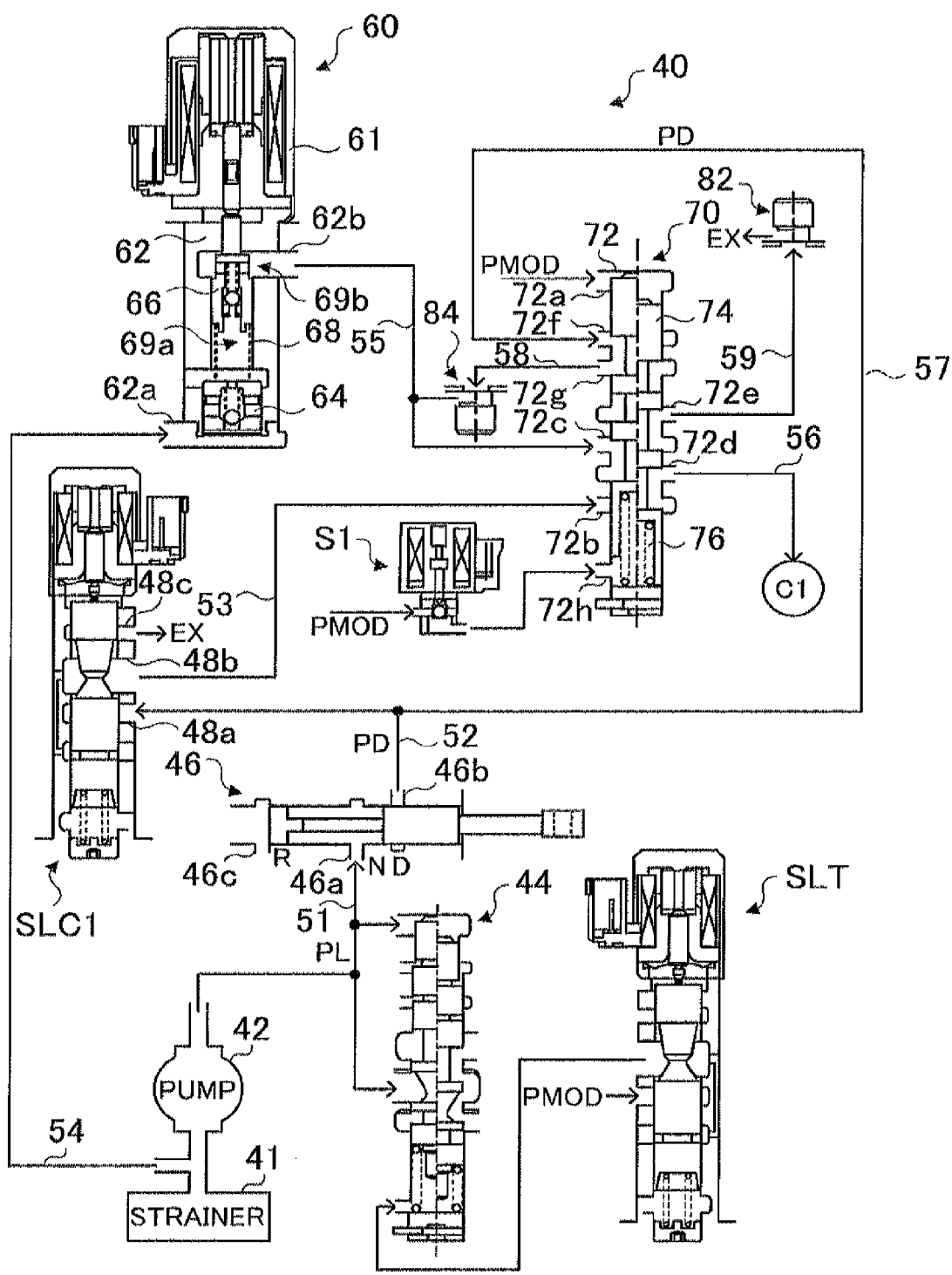
FIG. 4 is a block diagram showing a schematic structure of a hydraulic circuit 40.

In the speed change mechanism 30, the hydraulic circuit 40 turns on and off (engages and disengages) the clutches C1 to C3, and turns on and off the brakes B1 and B2. As shown in FIG. 4, the hydraulic circuit 40 includes: a mechanical oil pump 42 that is operated by the power from the engine 12 to suction hydraulic oil via a strainer 41 and feed the hydraulic oil by pressure to a line pressure oil passage 51; a regulator valve 44 that regulates the hydraulic oil fed by pressure from the mechanical oil pump 42 to produce a line pressure PL; a linear solenoid valve SLT that drives the regulator valve 44 by regulating a modulator pressure PMOD produced from the line pressure PL via a modulator valve (not shown) and supplying the regulated pressure as a signal pressure to the regulator valve 44; a manual valve 46 that is provided with an input port 46a connected to the line pressure oil passage 51, a D-position (drive position) output port 46b connected to a drive pressure oil passage 52, and an R-position (reverse position) output port 46c, wherein when a shift lever is shifted to the D position, communication between the input port 46a and the D-position output port 46b is allowed and communication between the input port 46a and the R-position output port 46c is shut off; when the shift lever is shifted the R position, communication between the input port 46a and the D-position output port 46b is shut off and communication between the input port 46a and the R-position output port 46c is allowed; and when the shift lever is shifted to the N (neutral) position, communication between the input port 46a and the D-position output port 46b and communication between the input port 46a and the R-position output port 46c are both shut off; a linear solenoid valve SLC1 that is provided with an input port 48a connected to the drive pressure oil passage 52, an output port 48b connected to an output port oil passage 53, and a drain port 48c, and that receives through the input port 48a a drive pressure PD that is an output pressure from the D-position output port 46b, regulates the received pressure, and outputs the regulated pressure from the output port 48b, while draining a part of the received pressure from the drain port 48c; an electromagnetic pump 60 that is provided with a suction port 62a connected to the strainer 41 via a suction port oil passage 54 and a discharge port 62b connected to a discharge port oil passage 55, and that reciprocates a piston 66 by an electromagnetic force produced by a solenoid 61 so as to suction hydraulic oil through the suction port 62a and discharge the suctioned hydraulic oil from the discharge port 62b; a C1 relay valve 70 that selectively switches between a mode in which an SLC1 pressure that is an output pressure from the linear solenoid valve SLC1 is supplied to a hydraulic servo of the clutch C1 and a mode in which a discharge pressure from the electromagnetic pump 60 is supplied to the hydraulic servo of the, clutch C1; and an on/off solenoid valve S1 for supplying a signal pressure to the C1 relay valve 70. Here, FIG. 4 shows only the hydraulic pressure supply system for the clutch C1. However, hydraulic pressure supply systems for the clutches C2 and C3 and the brakes B1 and B2 can also be formed of known solenoid valves and relay valves in the same manner.

As shown in FIG. 4, the C1 relay valve 70 includes a sleeve 72 provided with various ports, a spool 74 that slides in the sleeve 72 to connect and disconnect between the ports, and a spring 76 that presses an end face of the spool. As the various ports, the sleeve 72 includes: a first signal pressure port 72a receiving the modulator pressure PMOD as a signal pressure to press the spool end face in the direction opposite to an urging force of the spring 76; an input port 72b connected to the output port oil passage 53 to receive the SLC1 pressure; an input port 72c connected to the discharge port oil passage 55 to receive the discharge pressure from the electromagnetic pump 60; an output port 72d connected to a C1 oil passage 56 for the clutch C1; a drain port 72e connected to a drain oil passage 59 equipped with a check valve 82; a communication port 72f connected to the drive pressure oil passage 52 via a bypass oil passage upstream side 57; a communication port 72g connected to a bypass oil passage downstream side 58; and a second signal pressure port 72h receiving the modulator pressure PMOD supplied through the on/off solenoid valve S1 as a signal pressure to press the spool end face in the same direction as the urging force of the spring 76. The discharge port oil passage 55 of the electromagnetic pump 60 is connected to the bypass oil passage downstream side 58 via the check valve 84. The check valve 84 allows oil to flow out from the bypass oil passage downstream side 58 to the discharge port oil passage 55, but prohibits oil from flowing from the discharge port oil passage 55 into the bypass oil passage downstream side 58.

In the C1 relay valve 70, the spool 74 is moved in the direction in which the spring 76 is compressed (to a location shown in the right half of the valve in FIG. 4) by the modulator pressure PMOD acting through the first signal pressure port 72a if the modulator pressure PMOD is equal to or higher than a pressure (preset pressure) overcoming the urging force of the spring 76. In this state, the input port 72b is communicated with the output port 72d, communication between the input port 72c and the output port 72d is shut off, the input port 72c is communicated with the drain port 72e, and communication between the communication ports 72f and 72g is shut off. Accordingly, the output port 48b of the linear solenoid valve SLC1 is communicated with the clutch C1 (hydraulic servo) via the output port oil passage 53, the input port 72b, the output port 72d, and the C1 oil passage 56, in this order; communication between the discharge port 62b of the electromagnetic pump 60 and the clutch C1 is shut off, and the discharge port 62b of the electromagnetic pump 60 is communicated with the check valve 82 via the discharge port oil passage 55, the input port 72c, drain port 72e, and the drain oil passage 59; and communication between the bypass oil passage upstream side 57 and the bypass oil passage downstream side 58 is shut off On the other hand, in the C1 relay valve 70, the spool 74 is moved by the urging force of the spring 76 in the direction in which the spring 76 is stretched (to a location shown in the left half of the valve in FIG. 4) when the modulator pressure PMOD equal to or higher than the pressure (preset pressure) overcoming the urging force of the spring 76 is not applied through the first signal pressure port 72a. In this state, communication between the input port 72b and the output port 72d is shut off, the input port 72c is communicated with the output port 72d, communication between the input port 72c and the drain port 72e is shut off, and communication between the communication ports 72f and 72g is allowed. Accordingly, communication between the output port 48b of the linear solenoid valve SLC1 and the clutch C1 is shut off; the discharge port 62b of the electromagnetic pump 60 is communicated with the clutch C1 via the discharge port oil passage 55, the input port 72c, output port 72d, and the C1 oil passage 56, in this order, communication between the discharge port 62b of the electromagnetic pump 60 and the check valve 82 is shut off; and the drive pressure oil passage 52 is communicated with the discharge port oil passage 55 via the bypass oil passage upstream side 57, the communication ports 72f and 72g, the bypass oil passage downstream side 58, and the check valve 84.

Figure 5:
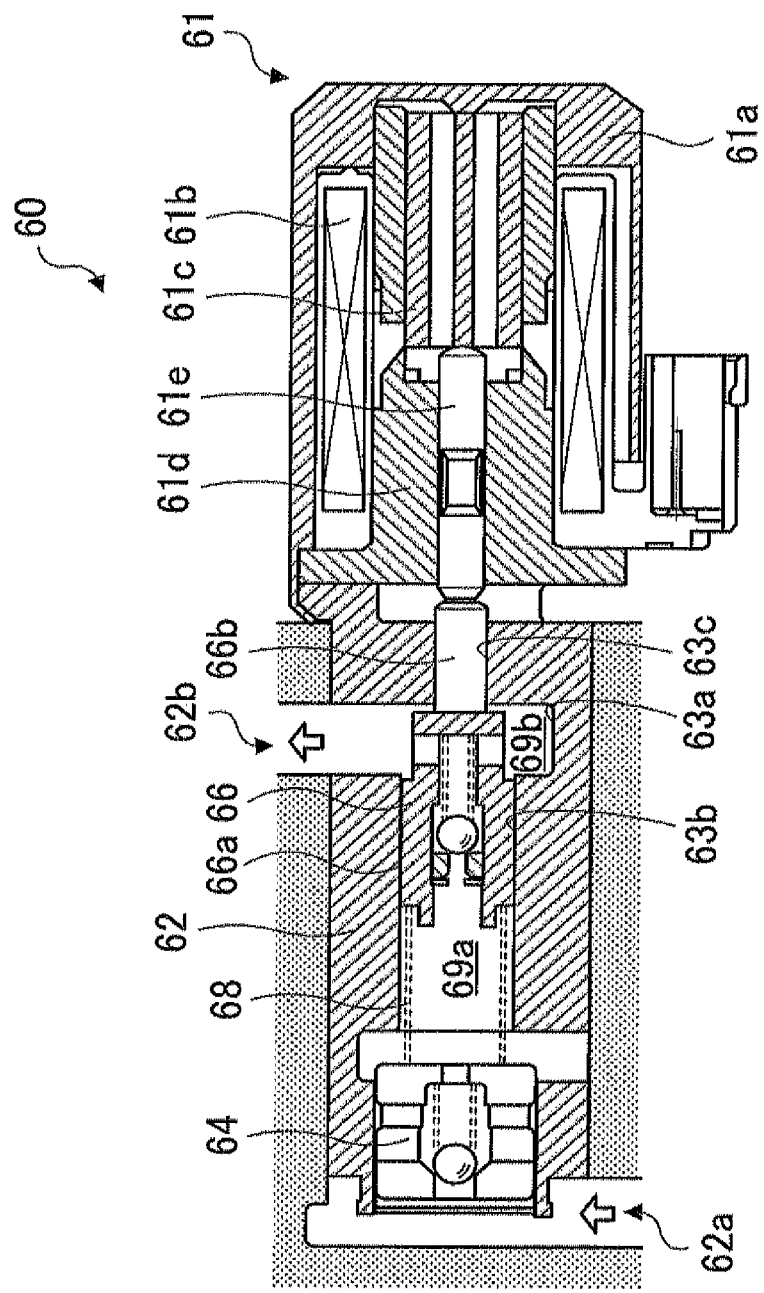
FIG. 5 is a structural diagram showing a schematic structure of an electromagnetic pump 60.

FIG. 5 is a structural diagram showing a schematic structure of the electromagnetic pump 60. As shown in the diagram, the electromagnetic pump 60 is provided with: a solenoid 61 generating an electromagnetic force; a cylinder 62 of a hollow cylindrical shape; the piston 66 that is inserted in the cylinder 62 and slidable by receiving a pressure produced by the electromagnetic force from the solenoid 61; an end plate 64 installed in an end portion of the cylinder 62; and a spring 68 that is interposed between the end plate 64 and the piston 66 and applies an urging force to the piston 66 in the direction opposite to the electromagnetic force of the solenoid 61. Thus, the electromagnetic pump 60 is structured as a piston pump that produces a hydraulic pressure by intermittently driving the solenoid 61 to reciprocate the piston 66. A suction check valve that allows the hydraulic oil to flow in from the suction port 62a and prohibits the hydraulic oil from flowing back to the suction port 62a is built into the end plate 64. A discharge check valve that allows the hydraulic oil to flow out to the discharge port 62b but prohibits the hydraulic oil from flowing back from the discharge port 62b is built into the piston 66.

The solenoid 61 is formed of a case 61a serving as a bottomed cylindrical member in which an electromagnetic coil 61b, a plunger 61c serving as a mover, and a core 61d serving as a stator are arranged. In the solenoid 61, the plunger 61c is attracted by a magnetic circuit formed by applying a current to the electromagnetic coil 61b so as to push forward a shaft 61e that is in contact with a distal end of the plunger 61c.

In the cylinder 62, a first pump chamber 69a formed by a space surrounded by an inner wall of the cylinder 62, the end plate 64, and the piston 66 are formed. When the electromagnetic force has been canceled so that the piston 66 is pushed back by the urging force of the spring 68 from the state in which the piston 66 is pushed forward by the electromagnetic force of the solenoid 61, the first pump chamber 69a of the cylinder 62 changes in the direction that increases the volume in the first pump chamber 69a. As a result, the pressure in the first pump chamber 69a is reduced to be lower than the pressure on the suction port 62a side, and therefore the hydraulic oil is suctioned into the first pump chamber 69a. When the piston 66 is pushed forward by the electromagnetic force of the solenoid 61, the first pump chamber 69a changes in the direction that decreases the volume in the first pump chamber 69a. As a result, the pressure in the first pump chamber 69a is increased to be higher than the pressure on the discharge port 62b side, and therefore the hydraulic oil is discharged from the first pump chamber 69a.

The cylinder 62 is also provided, near a portion thereof to which the solenoid 61 is attached, with a sliding surface 63b on which a body portion 66a of the piston 66 slides and a sliding surface 63c on which a shaft portion 66b of the piston 66 slides and that has a smaller inner diameter than that of the sliding surface 63b. The sliding surfaces 63b and 63c are stepped relative to each other with a groove 63a that is carved around the entire circumference of the cylinder 62 interposed therebetween. Thus, a space (second pump chamber 69b) surrounded by the groove 63a and a back surface of the body portion 66a of the piston 66 is formed in the state in which the piston 66 is inserted. This space changes in the direction that increases the volume in the space when the piston 66 is pushed forward by the electromagnetic force of the solenoid 61, and changes in the direction that decreases the volume in the space when the piston 66 is pushed back by the urging force of the spring 68. In the piston 66, a pressure receiving area receiving the pressure from the first pump chamber 69a side is larger than a pressure receiving area receiving the pressure from the second pump chamber 69b side. Therefore, the volume change of the first pump chamber 69a is larger than the volume change of the second pump chamber 69b when the piston 66 is reciprocated. Consequently, when the piston 66 is pushed forward by the electromagnetic force of the solenoid 61, the hydraulic oil of an amount corresponding to a difference between the reduction in the volume of the first pump chamber 69a and the increase in the volume of the second pump chamber 69b is discharged from the first pump chamber 69a through the discharge port 62b, via the discharge check valve built into the piston 66 and the second pump chamber 69b. When the piston 66 is pushed back by the urging force of the spring 68 due to canceling of the electromagnetic force of the solenoid 61, the hydraulic oil of an amount corresponding to the reduction in the volume of the second pump chamber 69b is discharged from the second pump chamber 69b through the discharge port 62b. This makes it possible to discharge the hydraulic oil twice through the discharge port 62b for one reciprocation of the piston 66, whereby discharge variation can be reduced and discharge performance can be improved as well.

In the vehicle 10 of the embodiment thus structured, when the vehicle 10 is running with the shift lever in the D position, the engine 12 is automatically stopped when all of preset automatic stop conditions are satisfied, such as the vehicle speed V being zero, the accelerator being off, and the brake switch signal BSW being on. After the engine 12 is automatically stopped, the engine 12 is automatically started when preset automatic start conditions are satisfied, such as the brake switch signal BSW being off. The main ECU 90 executes the automatic start control and the automatic stop control of the engine 12 as described above by receiving various detection signals, determining that the automatic stop conditions or the automatic start conditions are satisfied, and then sending a control command in accordance with the determination result to the engine ECU 15 and the AT ECU 16.

Figure 6:
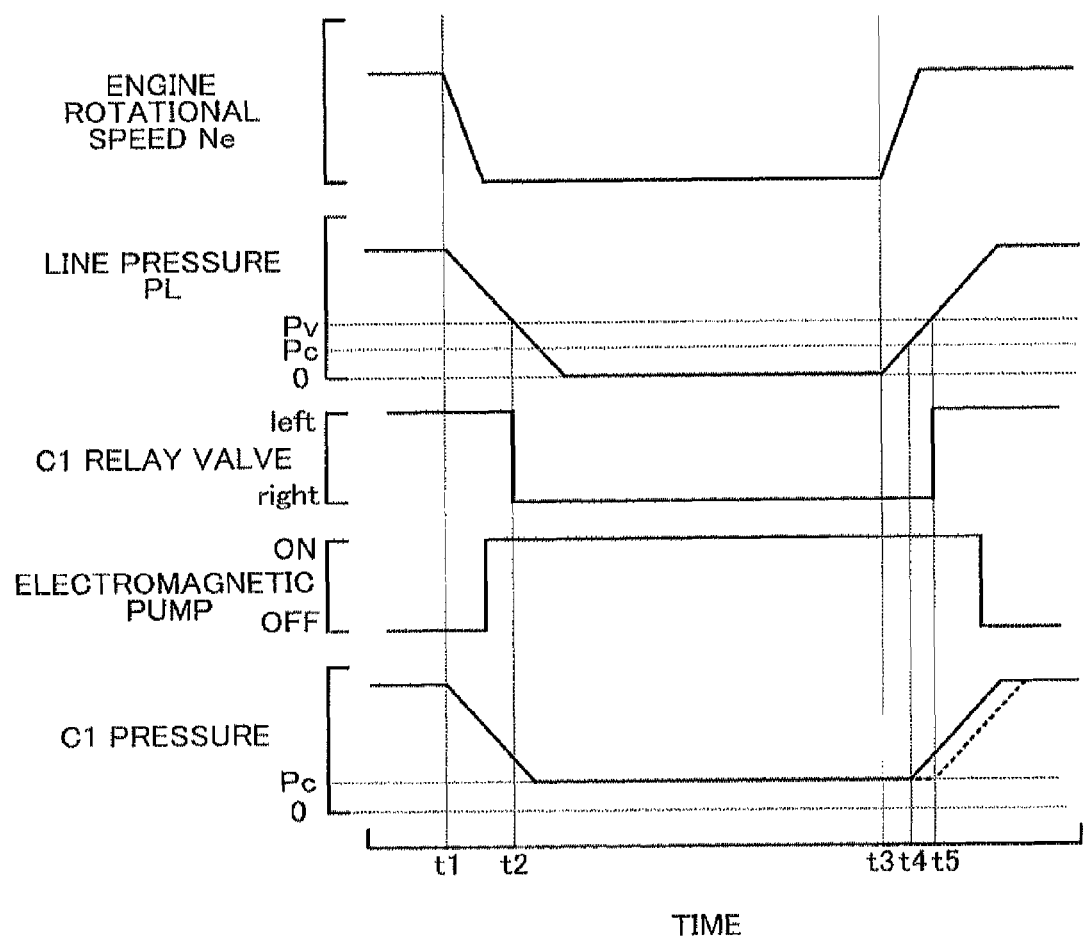
FIG. 6 is an explanatory diagram showing time-dependent changes of an engine rotational speed Ne, a line pressure PL, an operational state of a C1 relay valve 70, an operational state of the electromagnetic pump 60, and a C1 pressure.

Here, a case in which the automatic stop conditions are satisfied so that and thus the engine 12 is automatically stopped, and then the automatic start conditions are satisfied so that the engine 12 is automatically started, will be considered. FIG. 6 shows time-dependent changes of an engine rotational speed Ne, the line pressure PL, an operational state of the C1 relay valve 70, an operational state of the electromagnetic pump 60, and a C1 pressure. After the automatic stop conditions are satisfied so that the engine 12 is automatically stopped at time t1, the line pressure PL (modulator pressure PMOD) drops as the rotational speed of the engine 12 drops. When the modulator pressure PMOD becomes lower than the preset pressure of the C1 relay valve 70 (corresponding to the line pressure PL lower than a predetermined pressure Pv) at time t2, the state of the C1 relay valve 70 switches from the state in which the output port 48b of the linear solenoid valve SLC1 is communicated with the clutch C1 to the state in which the discharge port 62b of the electromagnetic pump 60 is communicated with the clutch C1. Therefore, a hydraulic pressure can be applied to the clutch C1 by driving the electromagnetic pump 60. In the embodiment, a hydraulic pressure required for holding a clutch piston of the clutch C1 at a stroke end is applied to the clutch C1. Then, when the automatic start conditions of the engine 12 are satisfied at time t3, a starter motor (not shown) starts cranking the engine 12, and then the line pressure PL (modulator pressure PMOD) increases as the rotational speed of the engine 12 increases. In this case, the C1 relay valve 70 maintains the state in which the discharge port 62b of the electromagnetic pump 60 is communicated with the clutch C1, and communication between the output port 48b of the linear solenoid valve SLC1 and the clutch C1 is shut off, until the modulator pressure PMOD reaches the preset pressure or higher. Therefore, the SLC1 pressure from the linear solenoid valve SLC1 cannot be supplied to the clutch C1 during this period. However, in this state of the C1 relay valve 70, the drive pressure oil passage 52 is communicated with the discharge port oil passage 55 via the bypass oil passage upstream side 57, the communication ports 72f and 72g, bypass oil passage downstream side 58, and the check valve 84. As a result, the line pressure PL (drive pressure PD) is introduced to the discharge port oil passage 55, and supplied from the discharge port oil passage 55 to the clutch C1 via the input port 72c, the output port 72d, and the C1 oil passage 56 (at time t4). Accordingly, the hydraulic pressure applied to the clutch C1 can be increased at an earlier time (refer to a solid line in FIG. 6) than in a device that starts supplying the SLC1 pressure from the linear solenoid valve SLC1 to the clutch C1 only after the state of the C1 relay valve 70 is switched to the state in which the C1 relay valve 70 provides communication between the output port 48b of the linear solenoid valve SLC1 and the clutch C1 (refer to a dashed line in FIG. 6). When the modulator pressure PMOD reaches the preset pressure or higher at time t5, the C1 relay valve 70 provides communication between the output port 48b of the linear solenoid valve SLC1 and the clutch C1, and thus the SLC1 pressure from the linear solenoid valve SLC1 is applied to the clutch C1, thus completely engaging the clutch C1. In this way, by supplying the hydraulic pressure from the electromagnetic pump 60 to the clutch C1 to cause the clutch C1 to stand by at a stroke-end pressure while the engine 12 is automatically stopped, the clutch C1 can be quickly engaged immediately after the engine 12 is automatically started, thereby allowing smooth starting.

Figure 7:
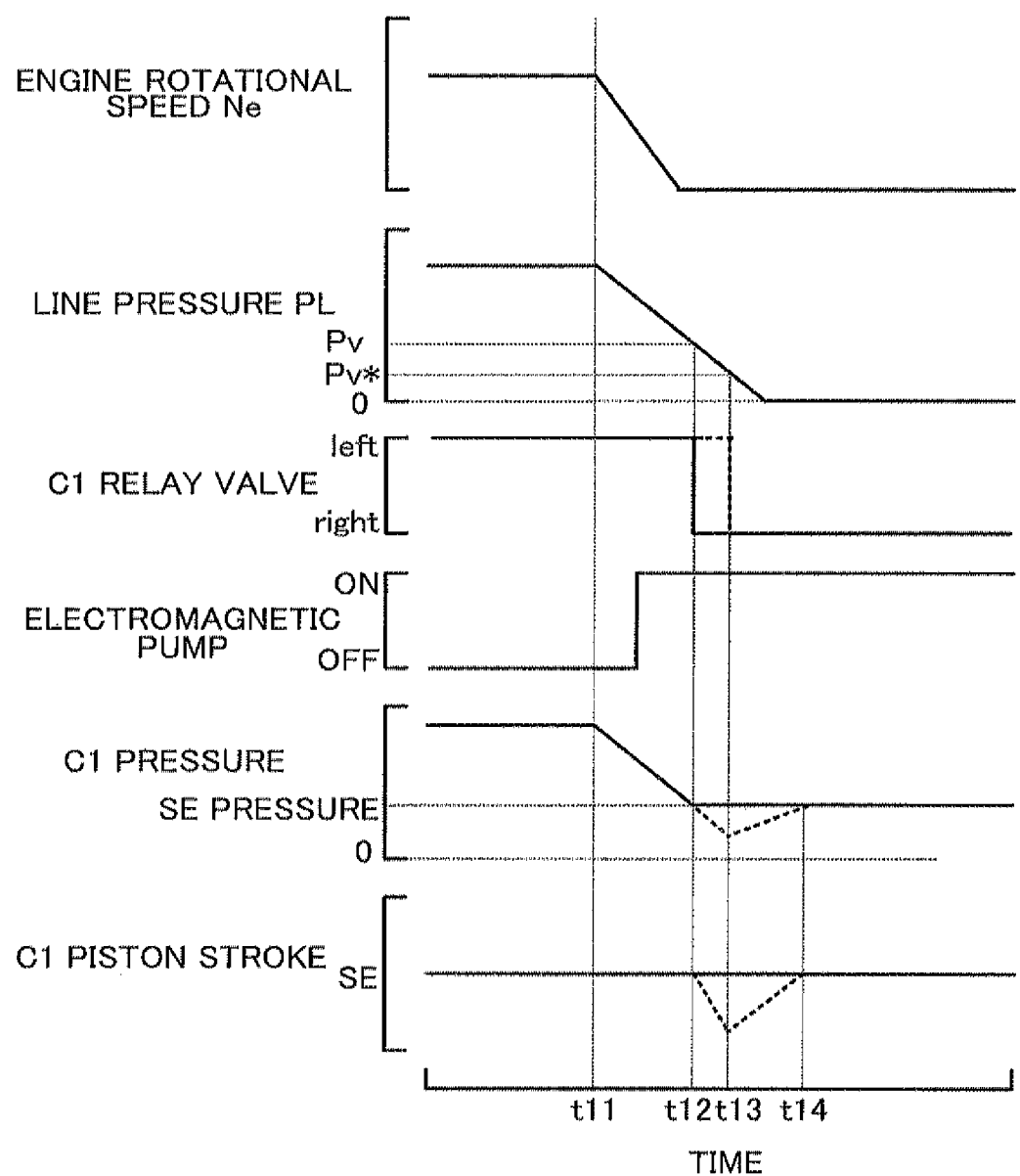
FIG. 7 is an explanatory diagram showing time-dependent changes of the engine rotational speed Ne, the line pressure PL, the operational state of the C1 relay valve 70, the operational state of the electromagnetic pump 60, the C1 pressure, and a C1 piston stroke when an engine 12 stops running.

Here, a case in which the spring 76 of the C1 relay valve 70 is replaced with that of a smaller spring load than in the embodiment will be considered. FIG. 7 shows time-dependent changes of the engine rotational speed Ne, the line pressure PL, the operational state of the C1 relay valve 70, the operational state of the electromagnetic pump 60, the C1 pressure, and a C1 piston stroke when the engine 12 stops running. In this case, because the preset pressure of the C1 relay valve 70 is lower, the spool 74 moves at a lower discharge pressure (modulator pressure PMOD) of the mechanical oil pump 42 than that of the embodiment when the engine 12 is started. As a result, the state of the C1 relay valve 70 switches from the state in which the discharge port 62b of the electromagnetic pump 60 is communicated with the clutch C1 to the state in which the output port 48b of the linear solenoid valve SLC1 is communicated with the clutch C1 at an earlier time, so that the SLC1 pressure from the linear solenoid valve SLC1 can be supplied to the clutch C1 from a relatively early time after the engine 12 has begun to start, thereby allowing the clutch C1 to be engaged quickly. On the other hand, when the engine 12 is stopped, the spool 74 does not move until the modulator pressure PMOD becomes lower than that of the embodiment because the spring load of the spring 76 is reduced. As a result, the state of the C1 relay valve 70 switches from the state in which the output port 48b of the linear solenoid valve SLC1 is communicated with the clutch C1 to the state in which the discharge port 62b of the electromagnetic pump 60 is communicated with the clutch C1 at a later time, so that the hydraulic pressure applied to the clutch C1 drops significantly below the stroke-end pressure, and thus the piston position of the clutch C1 moves away from the stroke end, as shown by dashed lines in FIG. 7. The electromagnetic pump 60 has a much smaller discharge capacity than that of the mechanical oil pump 42, and thus, requires a certain amount of time to cause the clutch C1 to stroke again. Therefore, if the engine 12 is started with the accelerator pedal deeply depressed during this time, the clutch C1 is not engaged in time. In the embodiment, the spring load of the spring 76 is set so that, when the engine 12 is stopped, the state of the C1 relay valve 70 switches from the state in which the output port 48b of the linear solenoid valve SLC1 is communicated with the clutch C1 to the state in which the discharge port 62b of the electromagnetic pump 60 is communicated with the clutch C1 while the SLC1 pressure from the linear solenoid valve SLC1 remains at or above a pressure required for the piston stroke of the clutch C1. Accordingly, the hydraulic pressure does not drop significantly below the stroke-end pressure when the C1 relay valve 70 is switched. Therefore, the inconvenience described above does not occur.

Figure 8:
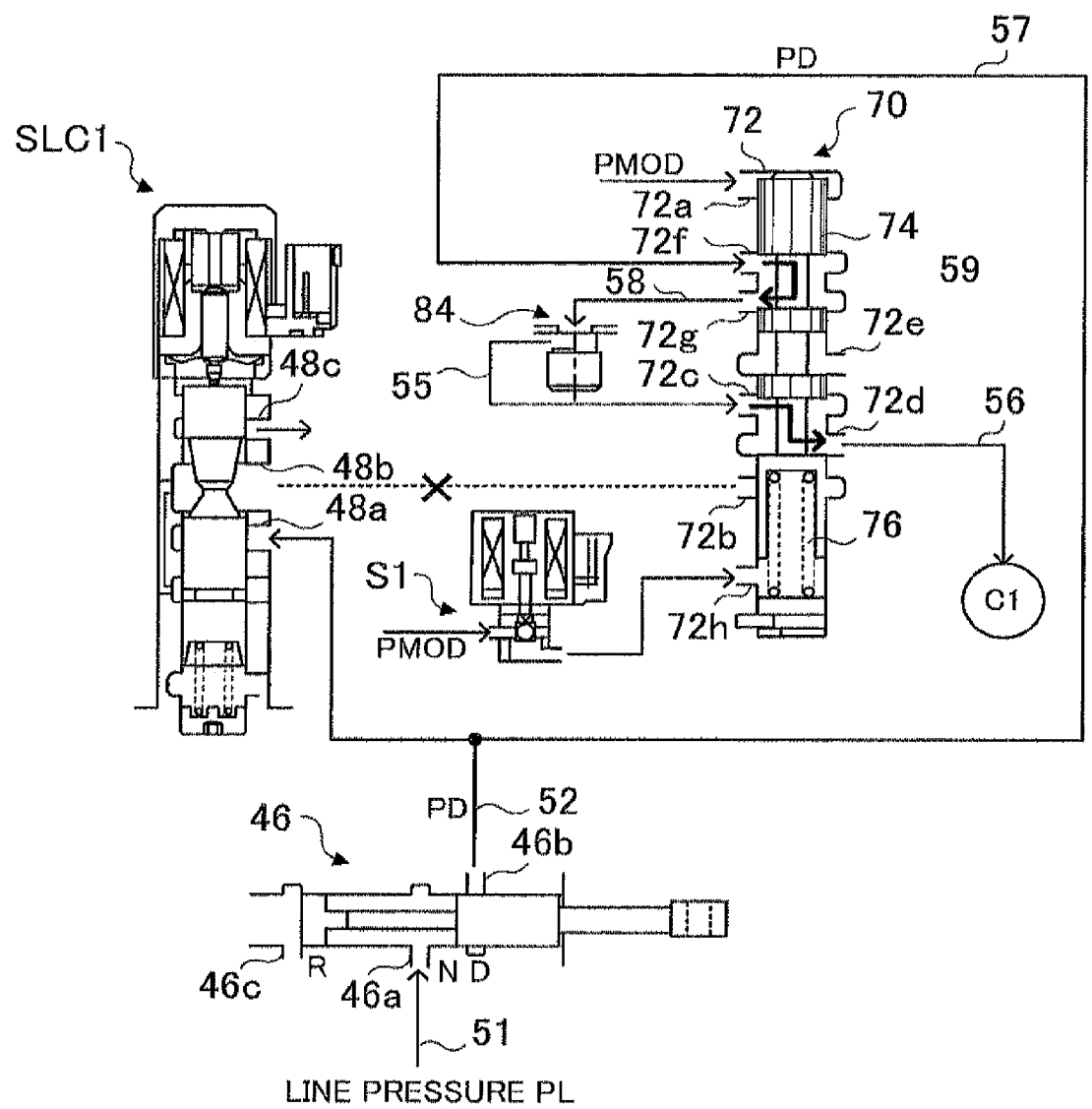
FIG. 8 is an explanatory diagram showing an operation of the hydraulic circuit 40.

Here, a case in which the spool 74 of the C1 relay valve 70 is stuck (adhered) with the C1 relay valve 70 providing communication between the discharge port 62b of the electromagnetic pump 60 and the clutch C1 when the clutch C1 is to be engaged to start the vehicle will be considered. FIG. 8 is an explanatory diagram showing an operation of the hydraulic circuit 40. In this case, communication between the output port 48b of the linear solenoid valve SLC1 and the clutch C1 is shut off by shutting off communication between the input port 72b and the output port 72d in the C1 relay valve 70. Accordingly, the clutch C1 cannot be engaged by the SLC1 pressure from the linear solenoid valve SLC1. However, in this state, as shown in FIG. 8, communications between the input port 72c and the output port 72d and between the communication ports 72f and 72g are allowed in the C1 relay valve 70, so as to allow the communication between the drive pressure oil passage 52 and the clutch C1 via the bypass oil passage upstream side 57, the communication ports 72f and 72g, the bypass oil passage downstream side 58, the check valve 84, the discharge port oil passage 55, the input port 72c, the output port 72d, and the C1 oil passage 56, in this order. Accordingly, the drive pressure PD is supplied to the clutch C1 while bypassing the linear solenoid valve SLC1. As a result, the clutch C1 can be engaged to start the vehicle even if the spool 74 of the C1 relay valve 70 is stuck.

Next, a case in which a failure occurs in the linear solenoid valve SLC1 when the vehicle runs with the clutch C1 engaged will be described. Note that the case in which the vehicle runs with the clutch C1 engaged corresponds to any case of the first forward speed, the second forward speed, or the third forward speed (refer to the operation table in FIG. 2) in the embodiment. In this case, the modulator pressure PMOD is supplied to the second signal pressure port 72h of the C1 relay valve 70 via the on/off solenoid valve S1. When the on/off solenoid valve S1 is turned on to supply the modulator pressure PMOD to the second signal pressure port 72h, the spool 74 is subjected to the urging force of the spring 76, the modulator pressure PMOD applied from the first signal pressure port 72a in the direction opposite to the urging force of the spring 76, and the modulator pressure PMOD applied from the second signal pressure port 72h in the same direction as the urging force of the spring 76. In this state, because communications between the input port 72c and the output port 72d and between the communication ports 72f and 72g are allowed in the C1 relay valve 70, the drive pressure oil passage 52 is communicated with the clutch C1 via the bypass oil passage upstream side 57, the communication ports 72f and 72g, the bypass oil passage downstream side 58, the check valve 84, the discharge port oil passage 55, the input port 72c, the output port 72d, and the C1 oil passage 56, in this order, thereby achieving the same state as that shown in FIG. 8. That is, the drive pressure PD is supplied to the clutch C1 while bypassing the linear solenoid valve SLC1. As a result, the vehicle can run with the clutch C1 engaged by turning on the on/off solenoid valve S1 even if a failure occurs in the linear solenoid valve SLC1.

With the power transmission device 20 of the embodiment described above, the bypass oil passage upstream side 57 is connected to the drive pressure oil passage 52 bypassing the linear solenoid valve SLC1, and the bypass oil passage downstream side 58 is connected to the discharge port oil passage 55 of the electromagnetic pump 60 via the check valve 84. The C1 relay valve 70 is structured so as to provide communication between the linear solenoid valve SLC1 (output port oil passage 53) and the clutch C1 (C1 oil passage 56), and shut off communications between the electromagnetic pump 60 (discharge port oil passage 55) and the clutch C1 and between the bypass oil passage upstream side 57 and the bypass oil passage downstream side 58, when the modulator pressure PMOD acting through the first signal pressure port 72a is the preset pressure or higher. The C1 relay valve 70 is also structured so as to shut off communication between the linear solenoid valve SLC1 (output port oil passage 53) and the clutch C1 (C1 oil passage 56) and provide communications between the electromagnetic pump 60 (discharge port oil passage 55) and the clutch C1 and between the bypass oil passage upstream side 57 and the bypass oil passage downstream side 58, when the modulator pressure PMOD acting through the first signal pressure port 72a is not the preset pressure or higher. Therefore, when the engine 12 is started, the discharge pressure from the mechanical oil pump 42 can be supplied to the clutch C1 even before the state of the C1 relay valve 70 is switched to the state in which the C1 relay valve 70 provides communication between the output port 48b of the linear solenoid valve SLC1 and the clutch C1. As a result, the hydraulic pressure applied to the clutch C1 can be increased at an earlier time than in a device that starts supplying the SLC1 pressure from the linear solenoid valve SLC1 to the clutch C1 after the state of the C1 relay valve 70 is switched to the state in which the C1 relay valve 70 provides communication between the output port 48b of the linear solenoid valve SLC1 and the clutch C1, thereby allowing the clutch C1 to be engaged quickly.

In addition, with the power transmission device 20 of the present invention, in the state in which the C1 relay valve 70 shuts off communication between the output port 48b of the linear solenoid valve SLC1 and the clutch C1, communications between the input port 72c and the output port 72d and between the communication ports 72f and 72g are allowed in the C1 relay valve 70 so as to provide communication between the drive pressure oil passage 52 and the clutch C1 via the bypass oil passage upstream side 57, the communication ports 72f and 72g, the bypass oil passage downstream side 58, the check valve 84, the discharge port oil passage 55, the input port 72c, the output port 72d, and the C1 oil passage 56, in this order. Therefore, even when the SLC1 pressure from the linear solenoid valve SLC1 cannot be supplied to the clutch C1 because the spool 74 of the C1 relay valve 70 is stuck, the drive pressure PD can be supplied to the clutch C1 while bypassing the linear solenoid valve SLC1, and thus the clutch C1 can be engaged to start the vehicle.

With the power transmission device 20 of the present invention, the C1 relay valve 70 is provided with the second signal pressure port 72h supplied with the modulator pressure PMOD via the on/off solenoid valve S1. Therefore, if a failure occurs in the linear solenoid valve SLC1 when the vehicle runs with the clutch C1 engaged, the modulator pressure PMOD can be applied to the second signal pressure port 72h by turning on the on/off solenoid valve S1 so as to allow communication between the communication ports 72f and 72g in the C1 relay valve 70, thereby allowing the drive pressure oil passage 52 to communicate with the clutch C1 via the bypass oil passage upstream side 57, the communication ports 72f and 72g, the bypass oil passage downstream side 58, the check valve 84, the discharge port oil passage 55, the input port 72c, the output port 72d, and the C1 oil passage 56, in this order. As a result, the vehicle can run with the clutch C1 engaged by turning on the on/off solenoid valve S1 even if a failure occurs in the linear solenoid valve SLC1.

Figure 9:
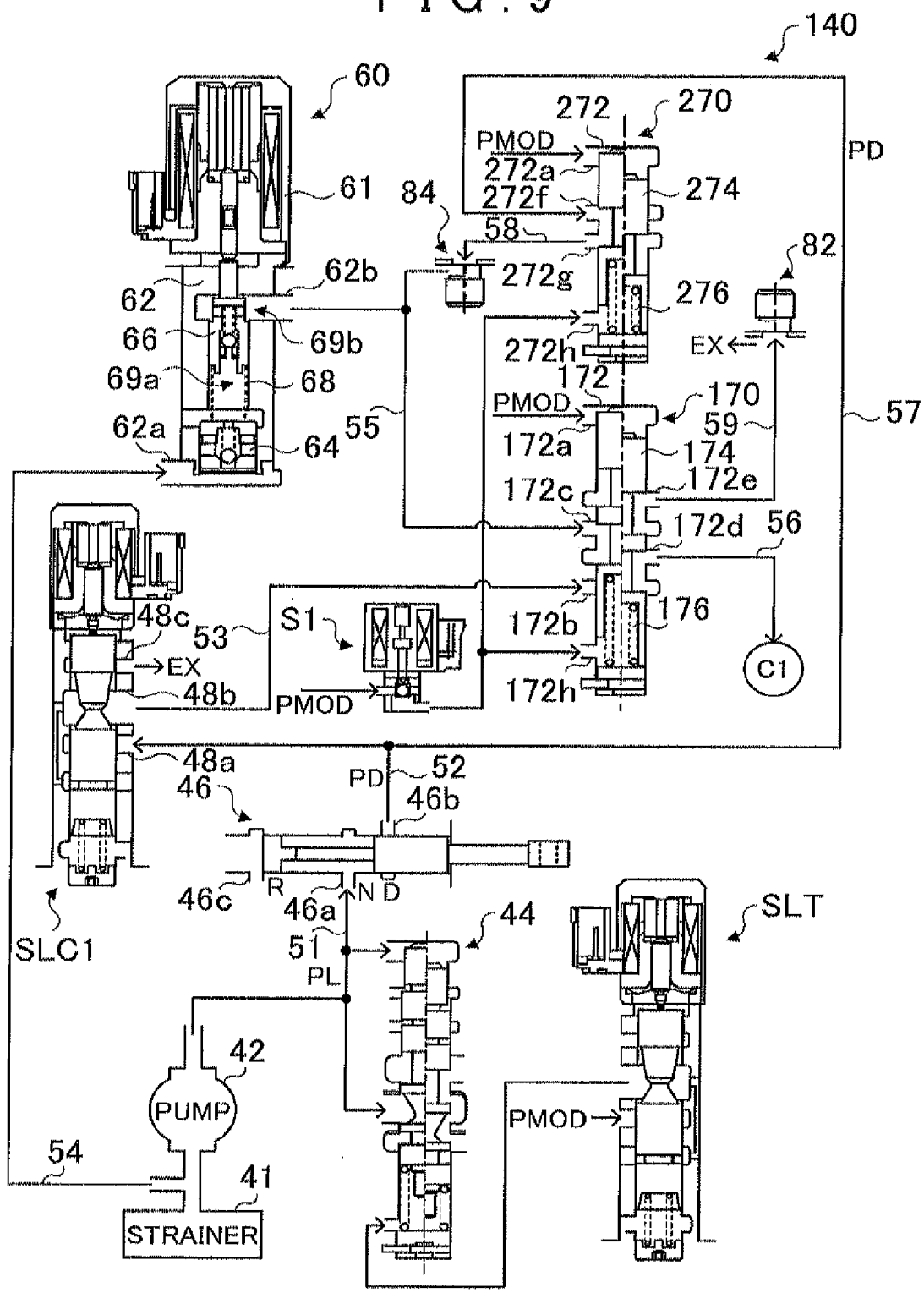
FIG. 9 is a block diagram showing a schematic structure of a hydraulic circuit 140 of a modification example.

In the power transmission device 20 of the embodiment, a single valve (the C1 relay valve 70) switches between communication between the linear solenoid valve SLC1 and the clutch C1 and communication between the electromagnetic pump 60 and the clutch C1, and also switches between allowing and shutting off of communication between the bypass oil passage upstream side 57 and the bypass oil passage downstream side 58. However, these switching operations may be performed by separate valves. FIG. 9 shows a hydraulic circuit 140 of a modification example. As shown in FIG. 9, the hydraulic circuit 140 of the modification example is provided with a C1 relay valve 170 and a bypass valve 270, instead of the C1 relay valve 70. The C1 relay valve 170 includes a sleeve 172 provided with various ports, a spool 174 that slides in the sleeve 172 to connect and disconnect between the ports, and a spring 176 that presses an end face of the spool. As the various ports, the sleeve 172 includes: a first signal pressure port 172a receiving the modulator pressure PMOD as a signal pressure to press the spool end face in the direction opposite to an urging force of the spring 176; an input port 172b connected to the output port oil passage 53 to receive the SLC1 pressure; an input port 172c connected to the discharge port oil passage 55 to receive the discharge pressure from the electromagnetic pump 60; an output port 172d connected to the C1 oil passage 56 to the clutch C1; a drain port 172e connected to the drain oil passage 59 equipped with the check valve 82; and a second signal pressure port 172h receiving the modulator pressure PMOD as a signal pressure to press the spool end face in the same direction as the urging force of the spring 176. In the same way, the bypass valve 270 also includes a sleeve 272 provided with various ports, a spool 274 that slides in the sleeve 272 to connect and disconnect between the ports, and a spring 276 that presses an end face of the spool. As the various ports, the sleeve 272 includes: a first signal pressure port 272a receiving the modulator pressure PMOD as a signal pressure to press the spool end face in the direction opposite to an urging force of the spring 276; a communication port 272f connected to the drive pressure oil passage 52 via the bypass oil passage upstream side 57; a communication port 272g connected to the bypass oil passage downstream side 58; and a second signal pressure port 272h receiving the modulator pressure PMOD as a signal pressure to press the spool end face in the same direction as the urging force of the spring 276.

In the power transmission device 20 of the embodiment, by connecting the bypass oil passage upstream side 57 to the drive pressure oil passage 52 and also the bypass oil passage downstream side 58 to the discharge port oil passage 55, the drive pressure PD can be supplied to the clutch C1 via the bypass oil passage even before the state of the C1 relay valve 70 is switched to the state in which the C1 relay valve 70 provides communication between the output port 48b of the linear solenoid valve SLC1 and the clutch C1. However, the power transmission device 20 may be structured to be capable of supplying the line pressure PL to the clutch C1 by connecting the bypass oil passage upstream side 57 to the line pressure oil passage 51, or may be structured to be capable of supplying the SLC1 pressure to the clutch C1 by connecting the bypass oil passage upstream side 57 to the output port oil passage 53.

In the power transmission device 20 of the embodiment, the check valve 84 is installed on the bypass oil passage downstream side 58. However, the check valve 84 may be installed on the bypass oil passage upstream side 57.

In the power transmission device 20 of the embodiment, in order to keep the clutch C1 engaged even if a failure occurs in the linear solenoid valve SLC1 when the vehicle runs with the clutch C1 engaged, the C1 relay valve 70 is provided with the second signal pressure port 72h that receives the modulator pressure PMOD via the on/off solenoid valve S1. However, the second signal pressure port 72h may be omitted.

Here, description will be made of correspondence relationships between the main elements of the embodiment and the main elements of the invention described in the section entitled Summary of the Invention. In the embodiment, the engine 12 corresponds to a "motor"; the clutches C1 to C3 and the brakes B1 and B2 correspond to "friction engagement elements"; the mechanical oil pump 42 corresponds to a "mechanical pump"; the regulator valve 44 and the linear solenoid valve SLC1 correspond to "pressure regulating valves"; the electromagnetic pump 60 corresponds to an "electric pump"; the C1 relay valve 70 corresponds to a "switching mechanism"; the bypass oil passage upstream side 57 and the bypass oil passage downstream side 58 correspond to "bypass oil passages"; and the check valve 84 corresponds to a "check valve". In the C1 relay valve 70, the first signal pressure port 72a corresponds to a "first signal pressure port"; the communication port 72*f* corresponds to a "first communication port"; the communication port 72*g* corresponds to a "second communication port"; the spool 74 corresponds to a "spool"; and spring 76 corresponds to an "urging member". Also in the C1 relay valve 70, the input port 72*b* corresponds to a "first input port"; the input port 72*c* corresponds to a "second input port"; and the output port 72*d* corresponds to an "output port". The on/off solenoid valve S1 corresponds to a "supply valve", and the second signal pressure port 72*h* corresponds to a "second signal pressure port". Here, the "motor" is not limited to the engine 12 serving as an internal combustion engine, but may be any type of motor, such as an electric motor. The "power transmission mechanism" may be provided with, not limited to the speed change mechanism 30 with six speeds of first to sixth forward speeds, a speed change mechanism with any number of speeds, such as four speeds, five speeds, or eight speeds. In addition, the "power transmission mechanism" is not limited to the automatic transmission, but may be any type of power transmission mechanism that can transmit power from the motor via the friction engagement elements, for example, by connecting the crankshaft 14 of the engine 12 to the wheels 19*a* and 19*b* via a clutch and directly via the differential gear 28. The "electric pump" is not limited to the electromagnetic pump 60, but may be any type of electric pump, such as an electric pump operated by power from an electric motor, that produces a hydraulic pressure by being operated by electric power supply. The "pressure regulating valve" is structured as a linear solenoid valve for direct control that directly controls the clutch by producing an optimal clutch pressure from the line pressure PL. However, a linear solenoid may be used as a linear solenoid for pilot control to drive a separate control valve, and the control valve may produce the clutch pressure to control the clutch. The "bypass oil passage" is not limited to one that supplies the line pressure PL produced by the regulator valve 44 as a hydraulic pressure supplied from the mechanical pump to the hydraulic servo of the friction engagement element. A hydraulic pressure corresponds to the hydraulic pressure from the mechanical pump as long as the hydraulic pressure increases in conjunction with the line pressure PL at the engine startup. Thus, the "bypass oil passage" may supply, for example, the output pressure from the linear solenoid valve SLC1 (SLC1 pressure) or the modulator pressure PMOD. The "switching mechanism" is not limited to one that uses as a signal pressure the modulator pressure PMOD reduced from the line pressure PL. The signal pressure may be changed to any pressure as appropriate, such as the line pressure PL or a hydraulic pressure reduced by a solenoid valve, as long as such hydraulic pressure is from a mechanical pump serving as a hydraulic pressure source. Note that, because the embodiment is only an example for giving a specific description of the embodiment of the invention described in the section entitled Summary of the Invention, the correspondence relationships between the main elements of the embodiment and the main elements of the invention described in the section entitled Summary of the Invention do not limit the elements of the invention described in the section entitled Summary of the Invention. That is, any interpretation of the invention described in the section entitled Summary of the Invention should be made based on the description in that section, and the embodiment is merely one specific example of the invention described in the section entitled Summary of the Invention.

The embodiment of the present invention has been described above. However, the present invention is not particularly limited to the embodiment, but can obviously be implemented in various modes without departing from the gist of the present invention.

The present invention can be used in the automotive industry.

What is claimed is:

1. A power transmission device that is mounted on a vehicle equipped with a motor and transmits power from the motor to a driving wheel side via a hydraulically driven friction engagement element, the power transmission device comprising:
    a mechanical pump that is driven by the power from the motor to produce a hydraulic pressure;
    a pressure regulating valve that regulates the hydraulic pressure from the mechanical pump;
    an electric pump that is driven by supplied electric power to produce a hydraulic pressure;
    a switching mechanism that is formed of one or more switching valves operated by a signal pressure produced based on the hydraulic pressure from the mechanical pump and that establishes a first state in which an output pressure of the pressure regulating valve can be supplied to a hydraulic servo of the friction engagement element when the signal pressure is a preset pressure or more, and establishes a second state in which the hydraulic pressure from the electric pump can be supplied to the hydraulic servo when the signal pressure is below the preset pressure;
    an electric pump oil passage configured to supply hydraulic pressure from the electric pump to the switching mechanism;
    a bypass oil passage that is connected to a downstream side of the mechanical pump, and is configured to supply hydraulic pressure output from the mechanical pump to the electric pump oil passage via the switching mechanism; and
    a check valve that is arranged in the bypass oil passage, and allows supply of the hydraulic pressure from the mechanical pump to the hydraulic servo and prohibits supply of the hydraulic pressure from the electric pump to the mechanical pump, wherein
    the switching mechanism is further structured so as to shut off communication through the bypass oil passage to the electric pump oil passage in the first state and allow communication through the bypass oil passage to the electric pump oil passage in the second state.

2. The power transmission device according to claim 1, wherein
    the switching mechanism includes:
        a first signal pressure port that is connected to a mechanical pump oil passage through which oil discharged from the mechanical pump flows;
        a first communication port that is connected to an upstream side of the bypass oil passage;
        a second communication port that is connected to a downstream side of the bypass oil passage;
        a spool that allows and shuts off communication between the first communication port and the second communication port; and
        an urging member that urges the spool,
    the switching mechanism is structured so as to shut off communication between the first communication port and the second communication port by moving the spool to one end side by a hydraulic pressure of the preset pressure or more when the hydraulic pressure acts through the first signal pressure port, and allow communication between the first communication port and the second communication port by moving the spool to a second end side by an urging force of the urging member when the hydraulic pressure of the preset pressure or more does not act through the first signal pressure port.

3. The power transmission device according to claim 2, wherein
the check valve is installed on the bypass oil passage between the switching mechanism and the electric pump oil passage.

4. The power transmission device according to claim 1, wherein
the switching mechanism further includes:
a first input port that is connected to a pressure regulating valve oil passage through which oil output from the pressure regulating valve flows;
a second input port that is connected to the electric pump oil passage, and
an output port that is connected to a hydraulic servo oil passage communicating with the hydraulic servo, and
the switching mechanism is formed of one switching valve that allows communication between the first input port and the output port and shuts off communication between the second input port and the output port by moving the spool to one end side by the hydraulic pressure of the preset pressure or more when the hydraulic pressure acts through the first signal pressure port, and that shuts off communication between the first input port and the output port and allows communication between the second input port and the output port by moving the spool to a second end side by the urging force of the urging member when the hydraulic pressure of the preset pressure or more does not act through the first signal pressure port.

5. The power transmission device according to claim 4, further comprising:
a supply valve that is installed in the mechanical pump oil passage and is capable of allowing and shutting off the hydraulic pressure supplied from the mechanical pump, wherein
the switching mechanism further includes a second signal pressure port connected to the mechanical pump oil passage via the supply valve, and is structured to establish the second state by moving the spool to the other end side by a hydraulic pressure and the urging force of the urging member when the hydraulic pressure acts through the second signal pressure port.

6. The power transmission device according to claim 1, wherein
the electric pump is an electromagnetic pump.

7. The power transmission device according to claim 1, further comprising:
a control unit that controls the pressure regulating valve so as to supply the hydraulic pressure from the mechanical pump to the hydraulic servo when the mechanical pump is in operation, and controls the electric pump so as to supply the hydraulic pressure from the electric pump to the hydraulic servo when the mechanical pump is not in operation.

* * * * *